July 22, 1958 C. H. THAYER 2,844,135
INTERNAL COMBUSTION PROCESS AND APPARATUS
Filed Nov. 8, 1954
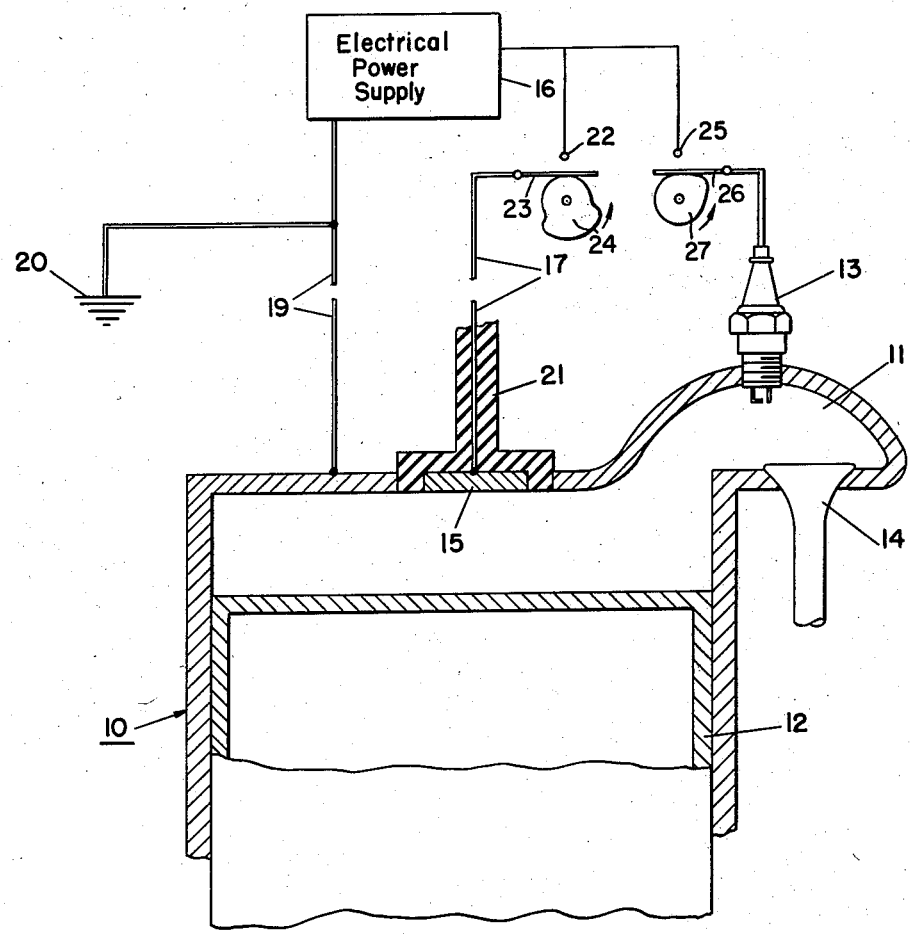
INVENTOR.
CLARENCE H. THAYER
ATTORNEY United States Patent Office 2,844,135
Patented July 22, 1958

2,844,135

INTERNAL COMBUSTION PROCESS AND APPARATUS

Clarence H. Thayer, Wallingford, Pa., assignor to Sun Oil Company, Philadelphia, Pa., a corporation of New Jersey Application November 8, 1954, Serial No. 467,533

10 Claims. (Cl. 123—191)

This invention relates to process and apparatus for internal combustion and for reduction of knocking therein.

The purpose of the invention is to reduce knocking by changing the flame characteristics in the combustion chamber. In the conventional automotive engine, after the spark has ignited the fuel prior to the power stroke, the flame proceeds from the point of ignition through the combustion chamber to a locus therein, known as the end zone, which is remote from the point of ignition. The location of the end zone depends on the construction of the combustion chamber, and there may in some instances be more than one end zone, e.g. in a T-head engine with the spark plug in the center of the head and end zones at both ends of the cross-bar of the T. An explosion of fuel in an end zone of the combustion chamber prior to arrival of the flame front at the end zone may result in detonation, i. e. knocking.

According to the present invention, detonation is reduced by applying an electrical field to the combustion chamber. The electrical field is preferably established between the piston and block on one hand and an electrode insulated from the piston and block on the other. Preferably, the piston and block are maintained at ground potential for reasons of safety.

The invention will be further described with reference to the attached drawing which illustrates an internal combustion engine according to the invention.

The engine shown in the drawing comprises a combustion chamber housing 10 having a recessed portion 11 in the upper end thereof at one side, the engine being an L-head engine; a piston 12 adapted for reciprocating motion within the housing 10; a spark plug 13 in the recessed portion 11 of the housing 10; intake and exhaust valves 14, only one of which is visible in the drawing; a cylindrical disc-shaped electrode 15 inserted in the engine head; and a power supply 16 for furnishing an electric potential to electrode 15 in order to create an electrostatic field. Power supply 16 is connected to electrode 15 through electrical connection 17. The other terminal of power supply 16 is connected through connection 19 with the engine block, which is at ground potential as indicated at 20. In an automobile, the apparatus is sufficiently grounded by merely connecting the power supply to the engine block by means of connection 19. Electrode 15 and connection 17 are insulated from the rest of the engine by means of ceramic insulation 21.

In the operation of the engine, an electrostatic field is applied between electrode 15 and the piston, and also to some extent between the electrode 15 and the nearest portions of the engine block, during at least a portion of the engine cycle. Thus at the beginning of a cycle, fuel is introduced into the combustion chamber through intake valve 14 while the piston is traveling downwardly, and the fuel is then compressed while the piston moves upwardly. A spark is then supplied by spark plug 13 to the compressed fuel, and the flame proceeds from the point of ignition toward that part of the combustion chamber directly beneath electrode 15. During this period an electrostatic field is applied to the combustion chamber by supplying a high potential to the electrode 15. The electrostatic lines of force between electrode 15 and the top of the piston 12 are generally perpendicular to and intersect the path of travel of the flame, and effect the speed of flame propagation and the area of the flame front, and thereby reduce the tendency for detonation caused by premature explosion in the zone beneath electrode 15. There are also electrostatic lines of force between electrode 15 and the nearest portions of the engine block, which lines of force have essentially the same direction as the path of travel of the flame. These lines of force may also have some beneficial effect on the speed of flame propagation.

It is believed that the mechanism of reducing the speed of flame propagation may involve at least in part the action of the electrostatic field on positively charged ions produced in the gases in the combustion chamber during the combustion process. In the case where electrode 15 is negatively charged, these positively charged ions are attracted toward electrode 15, and the path of travel of the flame will be changed. The inhibition of the flame in the end zone may be caused by the cooling effect involved in spreading out, i. e. increasing the area of the flame front by deflecting it from its normal path, or in attracting the flame front to a metal surface which is cooler than the interior of the combustion chamber.

The mechanism of the reduction of detonation according to the present invention is believed to possibly involve the acceleration of the flame front in the combustion chamber in the period immediately subsequent to the spark. Thus as the flame front moves toward the space directly influenced by the electrical field, the negatively charged electrode exerts an attracting influence on the positively charged ions in the burning gases, with the result that the flame front moves toward that space at a more rapid rate than it otherwise would. It is believed that this effect may result in the passage of the flame front to the end zone sufficiently rapidly that it arrives there before the gases in the end zone have had an opportunity to explode causing a detonation.

The electrostatic field can be applied continuously to the material in the combustion chamber, or it can be applied intermittently and timed in such a way that it coincides with the passage of the flame toward the end zone. Generally satisfactory results are obtained with either manner of operation. If the field is applied intermittently, its duration should be at least 5° during the period between the spark and 180° after the spark, a single revolution constituting 360°. In the case of intermittent application of the electrostatic field, the turning off and on of the electrostatic field can be automatically accomplished by use of the same general type of apparatus and operation which is involved in the timing of the spark.

Means for intermittent application of the electrostatic field according to one embodiment of the invention are illustrated in the drawing by the cams 24 and 27. The raised portion of the cam 27 is adapted to cause contact between timer contacts 25 and 26 to supply electric current to the spark plug 13 and provide the spark at the desired moment in the cycle. The raised portion of the cam 24 is adapted to cause contact between timer contacts 22 and 23, thereby supplying electric current to the electrode 15 to provide an electrostatic field beginning during the power stroke and continuing during a substantial portion of that stroke. In a revolution lasting 54.5 milliseconds, as in operation at 1100 R. P. M., the cam 24 is adapted to provide initiation of the field 10 milliseconds after the spark and termination of the field 25 milliseconds after the spark as in run No. 6 described subsequently. Any other suitable means can be employed to time the electrostatic field with respect to the spark.

Generally it is preferred that the electrostatic field which is employed have a high intensity, since high intensities produce a greater effect on the flame propagation. However the field intensity should be below that which produces an electric discharge between the electrode 15 and the piston or engine block. The field intensity is preferably not greater than about 27,500 volts per centimeter, in order to avoid possibility of sparking. Preferably the field intensity is at least about 1000 volts per centimeter, more preferably at least about 10,000 volts per centimeter. The field intensities referred to are those obtained by dividing the voltage applied to electrode 15 by the distance between electrode 15 and the top of piston 12, or by the distance between the electrode and the nearest portion of the engine block, whichever distance is shorter. The distance between electrode and piston varies during the cycle between limits at top dead center, where in a Lauson test engine for example the distance may be about 0.13 cm., and at bottom dead center, where in such engine the distance may be about 7.11 cm. The distance between the electrode and the nearest portion of the engine block depends on the manner in which the electrode is mounted in the engine. In the subsequent example this distance is about 0.2 cm.; therefore, the distance between electrode and piston is shorter than that between electrode and block during one part of the cycle and greater during another part of the cycle.

It is preferred according to the present invention that the insulated electrode be negatively charged with respect to the engine block, the induced charge in the piston being therefore positive. It has been found that in some instances at least, a field so directed produces a reduction of detonation under conditions wherein a field in the opposite direction is not effective to produce a reduction of detonation.

The preceding description has related to the use of an electrostatic field to reduce detonation in an internal combustion engine. The invention also contemplates the use of a rapidly alternating electrical field, such as may be obtained by substituting for the electric power supply 16 described with reference to the drawing, an oscillator capable of producing an alternating electrical field. In the use of such an alternating field, the flame front may actually be quenched in the end zone of the combustion chamber, this quenching preventing detonation by explosion of gases in the end zone. In such operation the frequency of the alternating field is preferably within the approximate range from $10^3$ to $10^7$ cycles per second.

The following example illustrates the invention.

A series of tests was made with an apparatus generally similar to that shown in the drawing, the engine being a Lauson test engine. The diameter of the piston was approximately 2⅝", and the electrode 15 was a cylindrical disc coaxial with the piston and having diameter of about 0.25". Means were provided for applying the electrostatic field during each cycle at a predetermined time in relation to the spark, which occurred about 3° before top dead center. Means were also provided for discontinuing the application of the electrostatic field at a predetermined time in each cycle after the field had been applied.

A series of runs was made wherein, in each run, comparison was made of the operation of the engine when the electrostatic field was being applied in the manner described in the preceding paragraph with operation under the same conditions except that no electrostatic field was applied. The fuel employed in the engine was one which exhibited a substantial tendency for detonation. The operation was rated according to the following scale: no knocking—0, very light knocking—1, light knocking—2, heavy knocking—3, very heavy knocking—4. The ratings were made by an experienced operator who listened to the engine in operation and rated each operation according to the preceding scale, without being aware in any instance of whether the electrostatic field was being applied or not, the latter being controlled by another operator.

In the following table, the results for 8 runs are shown, the results indicated for each run being an average of several runs under identical conditions. The table shows for each run the delay in milliseconds, i. e. the number of thousandths of a second by which the spark preceded the initiation of the electrostatic field in each cycle; in run No. 2 the delay was zero, the spark and the initiation of the electrostatic field being simultaneous. The table also shows the duration of the electrostatic field, i. e. the number of milliseconds in each cycle elapsing between the initiation of the electrostatic field and its termination.

In each run three different engine speeds were employed, 1100 R. P. M., 1500 R. P. M., and 1800 R. P. M. Runs were also made at 2000 R. P. M., but these are not shown in the table, since there was no knocking in these runs even when the field was not applied. It is noted incidentally that operation at 1100 R. P. M. involves a period of 54.5 milliseconds per revolution; 1500 R. P. M., 40 milliseconds per revolution; and 1800 R. P. M., about 33.3 milliseconds per revolution.

| Run No. | Duration in millisec. | Delay in millisec. | Voltage | Field Applied Knock Rating—Engine Speed, R. P. M. | | | No Field Applied Knock Rating—Engine Speed, R. P. M. | | |
|---|---|---|---|---|---|---|---|---|---|
| | | | | 1,100 | 1,500 | 1,800 | 1,100 | 1,500 | 1,800 |
| 1 | <0.5 | 1 | 3,100 | 2 | 4 | 2 | 2 | 4 | 2 |
| 2 | 0.5 | 0 | 3,100 | 2 | 3 | 2 | 2 | 3 | 2 |
| 3 | 0.5 | 11 | 3,100 | 2 | 4 | 2 | 2 | 3 | 2 |
| 4 | 0.5 | 20 | 2,100 | 2 | 4 | 2 | 2 | 4 | 2 |
| 5 | 1 | 1 | 3,100 | 1 | 3 | 1 | 2 | 4 | 2 |
| 6 | 15 | 10 | 3,100 | 0 | 2 | 0 | 2 | 3 | 2 |
| 7 | 15 | 10 | 3,100 | 0 | 2 | 1 | 2 | 3 | 2 |
| 8 | 15 | 11 | 3,100 | 0 | 2 | 1 | 2 | 3 | 2 |

It is noted that in the preceding table runs 1 through 4 inclusive do not provide any reduction of knocking by application of the electrostatic field, since the duration of the application of the electrostatic field was not sufficiently great to produce the desired result. In runs 5 through 8, inclusive, however, a substantial reduction in knocking was obtained by application of the electrostatic field. Accordingly it is concluded that the duration of the application of the electrostatic field should be greater than in runs 1 through 4.

The invention claimed is:

1. An internal combustion engine comprising: a combustion chamber housing; a piston adapted for reciprocating motion within the housing; means for supplying a spark to the fuel in the combustion chamber; and means for applying an electrical field to the combustion chamber during the period between the spark and 180° after the spark, the place of application of the field being spaced apart from the place of ignition.

2. An engine according to claim 1 wherein said field is an electrostatic field.

3. An engine according to claim 2 wherein said means for applying comprise a negatively charged electrode communicating with the combustion chamber and positioned above the upper limit of travel of the piston.

4. Method for reducing knock in a spark-ignition internal combustion engine which comprises igniting fuel in the combustion chamber by means of a spark, and applying an electrical field to the combustion chamber, the duration of said applying being at least 5° during the period between the spark and 180° after the spark, the field being applied at a location spaced apart from the place of ignition, the field thereby intersecting the path of travel of the flame from the place of ignition through the combustion chamber.

5. Method according to claim 4 wherein said field is an electrostatic field.

6. Method according to claim 5 wherein said electrical field is applied through a negatively charged electrode communicating with the combustion chamber and positioned above the upper limit of travel of the piston.

7. A four-stroke cycle engine according to claim 1.

8. A fuel compression engine according to claim 1.

9. Method according to claim 4 and involving a four-stroke cycle.

10. Method according to claim 4 and involving fuel compression operation.

References Cited in the file of this patent

UNITED STATES PATENTS

| | | |
|---|---|---|
| 2,093,339 | Pippig | Sept. 14, 1937 |
| 2,220,558 | Van Dijck et al. | Nov. 5, 1940 |
| 2,253,203 | Di Lucci | Aug. 19, 1941 |
| 2,331,912 | Holthouse | Oct. 19, 1943 |